June 5, 1951

M. S. NEWMAN 2,555,599

1-HYDROXY-6-ALKOXY-4-METHYLHEXADIENE-2,4
AND CARBOXYLIC ACID ESTERS THEREOF

Filed May 10, 1947

Propargyl alcohol + butyl magnesium chloride
+ 4-methoxybutanone-2

↓

Hydrolyzed with ammonium chloride solution –
Separated – Concentrated – Distilled.

↓

6-methoxy-4-methylhexyne-2-diol-1,4

↓

Dissolved in alcohol – Reduced under low hydrogen pressure using palladium on charcoal catalyst – Filtered – Solvent removed – Residue distilled under reduced pressure.

↓

6-methoxy-4-methylhexene-2-diol-1,4

↓

Dissolved in pyridine and added to cold acetic anhydride – Solvents removed by distillation – Fractionated.

↓

1-acetoxy-4-hydroxy-6-methoxy-4-methylhexene-2

↓

Mixed with potassium acid sulphate – Distilled under vacuum with inert atmosphere – Evacuated – Distilled – Fractionated.

↓

1-acetoxy-6-methoxy-4-methylhexadiene-2,4

↓

Mixed with sodium methoxide and methanol – Refluxed – Methanol removed by distillation – Water, hydrochloric acid and ether added – Aqueous layer extracted with ether – Washed with sodium bicarbonate solution – Ether removed by distillation. Residue distilled under vacuum.

↓

1-hydroxy-6-methoxy-4-methylhexadiene-2,4

↓

Dissolved in pyridine – Added to mixture of thionyl chloride and anhydrous pyridine – Taken up with water – Acidified with hydrochloric acid – Extracted with ether – Washed – Filtered

↓

1-chloro-6-methoxy-4-methylhexadiene-2,4

Fig 1

INVENTOR.
Melvin Spencer Newman
BY
Dann H. F. Schmieding
his ATTORNEY

June 5, 1951

M. S. NEWMAN 2,555,599

1-HYDROXY-6-ALKOXY-4-METHYLHEXADIENE-2,4
AND CARBOXYLIC ACID ESTERS THEREOF

Filed May 10, 1947

$$ClCH_2CH=CH-\underset{\underset{CH_3}{|}}{C}=CH-CH_2OCH_3$$

Fig 3

$$HOCH_2CH=CH-\underset{\underset{CH_3}{|}}{C}=CH-CH_2OCH_3$$

Fig 4

$$CH_3\overset{\overset{O}{\|}}{C}OCH_2CH=CH-\underset{\underset{CH_3}{|}}{C}=CH-CH_2OCH_3$$

Fig 5

$$CH_3\overset{\overset{O}{\|}}{C}OCH_2CH=CH-\underset{\underset{OH}{|}}{\overset{\overset{CH_3}{|}}{C}}-CH_2CH_2OCH_3$$

Fig 6

$$HOCH_2CH=CH-\underset{\underset{OH}{|}}{\overset{\overset{CH_3}{|}}{C}}-CH_2CH_2OCH_3$$

Fig 7

$$BrCH_2CH=CH-\underset{\underset{CH_3}{|}}{C}=CH-CH_2OCH_3$$

Fig 8

$$ICH_2CH=CH-\underset{\underset{CH_3}{|}}{C}=CH-CH_2OCH_3$$

INVENTOR.
Melvin Spencer Newman
BY
Warm H.F. Schmeding
his Attorney

June 5, 1951 — M. S. NEWMAN — 2,555,599
1-HYDROXY-6-ALKOXY-4-METHYLHEXADIENE-2,4
AND CARBOXYLIC ACID ESTERS THEREOF
Filed May 10, 1947

```
┌─────────────────────────────────────────────────────┐
│ Propargyl alcohol + butylmagnesium                  │
│ chloride + 4-methoxybutanone-2                      │
└─────────────────────────────────────────────────────┘
                        │
┌─────────────────────────────────────────────────────┐
│ Hydrolyzed with ammonium chloride solution-         │
│ Separated-Concentrated-Distilled                    │
└─────────────────────────────────────────────────────┘
                        │
┌─────────────────────────────────────────────────────┐
│ 6-methoxy-4-methylhexyne-2-diol-1,4                 │
└─────────────────────────────────────────────────────┘
                        │
┌─────────────────────────────────────────────────────┐
│ Dissolved in pyridine-Acetic anhydride              │
│ added-Distilled                                     │
└─────────────────────────────────────────────────────┘
                        │
┌─────────────────────────────────────────────────────┐
│ 1-acetoxy-4-hydroxy-6-methoxy-4-methylhexyne-2      │
└─────────────────────────────────────────────────────┘
                        │
┌─────────────────────────────────────────────────────┐
│ Mixed with crushed potassium acid                   │
│ sulphate-Distilled-Fractionated.                    │
└─────────────────────────────────────────────────────┘
                        │
┌─────────────────────────────────────────────────────┐
│ 1-acetoxy-6-methoxy-4-methylhexene-4-yne-2          │
└─────────────────────────────────────────────────────┘
                        │
┌─────────────────────────────────────────────────────┐
│ Added to solution of sodium methoxide in            │
│ absolute methanol-Organic product isolated          │
└─────────────────────────────────────────────────────┘
                        │
┌─────────────────────────────────────────────────────┐
│ 1-hydroxy-6-methoxy-4-methylhexene-4-yne-2          │
└─────────────────────────────────────────────────────┘
                        │
┌─────────────────────────────────────────────────────┐
│ Reduction under low hydrogen pressure using         │
│ palladium on charcoal catalyst in absolute          │
│ alcohol                                             │
└─────────────────────────────────────────────────────┘
                        │
┌─────────────────────────────────────────────────────┐
│ 1-hydroxy-6-methoxy-4-methylhexadiene-2,4           │
└─────────────────────────────────────────────────────┘
                        │
┌─────────────────────────────────────────────────────┐
│ Dissolved in pyridine-Added to mixture of           │
│ thionyl chloride and anhydrous pyridine-Taken       │
│ up with water-Acidified with hydrochloric           │
│ acid-Extracted with ether-Washed-Filtered           │
└─────────────────────────────────────────────────────┘
                        │
┌─────────────────────────────────────────────────────┐
│ 1-chloro-6-methoxy-4-                               │
│ methylhexadiene-2,4                                 │
└─────────────────────────────────────────────────────┘
```

Fig 9

INVENTOR.
Melvin Spencer Newman
BY
Warren H. F. Schmieding
his Attorney

Patented June 5, 1951

2,555,599

UNITED STATES PATENT OFFICE 2,555,599

1-HYDROXY-6-ALKOXY-4-METHYLHEXADIENE-2,4 AND CARBOXYLIC ACID ESTERS THEREOF

Melvin S. Newman, Columbus, Ohio, assignor to Ohio State University Research Foundation, Columbus, Ohio, a corporation of Ohio Application May 10, 1947, Serial No. 747,176

13 Claims. (Cl. 260—488)

This invention relates to new compounds or compositions of matter useful as intermediates in the synthetic production of vitamin A ethers and similar compounds and to processes for synthesizing such new compounds. It is illustrated by processes of forming 1-hydroxy-6-alkoxy-4-methylhexadiene-2,4 and its esters of organic acids and halogen acids. Examples of such organic acid esters are the acetate, propionate, butyrate, trimethylacetate and benzoate. Examples of such halogen acid esters are 1-iodo-6-methoxy-4-methylhexadiene-2,4, 1-chloro-6-methoxy-4-methylhexadiene-2,4 and 1-bromo-6-methoxy-4-methylhexadiene-2,4.

The specific hydroxy alkoxy methylhexeneynes which I have synthesized have all had alkoxy groups.

By use of the word "alkoxy" in the last sentence, elsewhere in this specification and in the claims, I mean a compound having an alkyl radical attached to the remainder of the molecule by oxygen where the alkyl radical has not more than six carbon atoms and we so define the term "alkoxy" herein. Compounds having an alkyl group with more than four carbon atoms but not more than six carbon atoms are operative and compounds having such an alkyl group with more than six carbon atoms may be operative but in later manipulations, the compounds involved may be more difficult to handle due to the higher temperatures necessary.

Prior to my discoveries, there has been no recognized method of preparing the above mentioned compounds. Nor had these materials been previously synthesized nor isolated.

One of the objects of my invention is the production of new intermediate chemical compounds useful in the synthesizing of vitamin A ethers, similar compounds, and other chemicals.

Another object of my invention is the provision of new methods of synthesizing various intermediates and other chemicals.

A further object of my invention is the provision of new methods for synthesizing 4-methylhexadienes-2,4.

A further object is the synthesis of new compounds of the formula

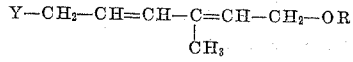

where Y represents a member of the group comprising hydroxyl and esters of a hydroxyl group and R represents a lower alkyl radical having not more than six carbon atoms.

Further objects of my invention are the syntheses of new 1-halogen-4-methylhexadienes, new 1-acyloxy-4-methylhexadienes, and new 1-hydroxy-4-methylhexadienes; and the provision of new methods of synthesizing such new compounds.

Further objects and advantages of the present invention will be apparent from the following description, reference being had to the accompanying drawings wherein preferred forms of embodiments of the invention are clearly shown.

In the drawings:

Fig. 1 illustrates a method of synthesizing some of the substances selected in illustration of my invention, the substances and methods shown constituting some of the preferred embodiments thereof;

Fig. 2 shows the structural formula of a chloroalkoxymethylhexadiene which may be synthesized by my process;

Fig. 3 shows the structural formula of a hydroxyalkoxymethylhexadiene which may be synthesized by my process;

Fig. 4 shows the structural formula of an acyloxyalkoxymethylhexadiene which may be synthesized by my process;

Fig. 5 shows the structural formula of an acyloxyhydroxyalkoxymethylhexene which may be synthesized by my process;

Fig. 6 shows the structural formula of an alkoxymethylhexene-diol which may be synthesized by my process;

Fig. 7 shows the structural formula of a bromoalkoxymethylhexadiene which may be synthesized by my process;

Fig. 8 shows the structural formula of an iodoalkoxymethylhexadiene which may be synthesized by my process; and Fig. 9 shows an alternate method of synthesizing some of the 4-methylhexadienes-2,4, illustrated in the other figures.

In general, the processes covered hereby relate to the synthesis of 1-hydroxy-6-alkoxy-4-methylhexadienes-2,4 and its esters. One method comprises the dehydration of 1-acyloxy-4-hydroxy-6-alkoxy-4-methylhexene-2; alcoholizing the resulting 1-acyloxy-6-alkoxy-4-methylhexadiene-2,4 to a 1-hydroxy-6-alkoxy-4-methylhexadiene-2,4; and then reacting with a suitable halogen acid derivative to form halogen esters (alkyl halides). The 1-acyloxy-6-alkoxy-4-methylhexadiene-2,4 is an ester of the 1-hydroxy-6-alkoxy-4-methylhexadiene-2,4 as are the halogen esters prepared therefrom. Although in the process described, the alcohol is obtained from the acyloxy ester, the acyloxy compound may be obtained from the alcohol if desired. Another method of forming the alcohol comprises the reduction of a 1-hydroxy-6-alkoxy-4-methylhexene-4-yne-2 to a 1-hydroxy-6-alkoxy-4-methylhexadiene-2,4; and then reacting with a suitable halogen acid derivative to form the corresponding halogen ester (alkyl halide).

The dehydration of the 1-acyloxy-4-hydroxy-6-alkoxy-4-methylhexene-2 may be accomplished by heating with a suitable dehydrating agent such as, for example, potassium acid sulfate or phenyl isocyanate or other isocyanates in a vacuum or in the absence of oxygen or in an inert atmosphere, the distillate being collected in fractions and used as such or fractionated again if desired.

The alcoholysis of the 1-acyloxy-6-alkoxy-4-methylhexadiene-2,4 may be accomplished by heating with a metal alcoholate in an anhydrous alcohol solution and isolating and purifying. Preferably, the metal alcoholate is prepared from the same alcohol as is used as a solvent, the metal alcoholate serving as a catalyst. For example, I may use corresponding sodium, calcium or aluminum alcoholates in methanol, ethanol, a propanol or a butanol.

The halogen esters may be prepared by reacting the 1-hydroxy-6-alkoxy-4-methylhexadiene-2,4 with a halogen containing acid derivative such as thinoyl chloride, thinoyl bromide, phosphorus trichloride, phosphorus tribromide and phosphorus pentachloride in an inert solvent in the presence of a tertiary amine acid-binding agent such as pyridine, the picolines, the lutidines, quinoline, the dialkyl anilines, or the trialkyl amines. To prepare the corresponding iodide, I prefer to replace the bromine or chlorine by refluxing with an inorganic iodide such as sodium iodide or potassium iodide in an acetone solution (i. e. a standard iodide exchange).

The reduction of the 1-hydroxy-6-alkoxy-4-methylhexene-4-yne-2 to the corresponding 1-hydroxy-4-methylhexadiene-2,4 may be accomplished either by a chemical reduction such as by solution in alcohol with a zinc copper alloy or by the use of hydrogen and a catalyst such as a supported palladium catalyst or a Raney iron catalyst.

In certain of the steps described, a caution has been given against the presence of oxygen. It is to be emphasized that the presence of oxygen should be avoided in all of the processes described.

One specific example of each of the two methods explained above for the synthesis of a 1-hydroxy-6-alkoxy-4-methylhexadiene-2,4 is illustrated in the accompanying drawings of Figs. 1 and 9. These specific examples are, however, merely illustrative and are not to be considered as constituting the invention covered hereby. The reactions involved in the specific examples illustrated in Figs. 1 and 9 and referred to in this paragraph are as follows: Equations 1–8, inclusive, show the reactions involved in the example illustrated in Fig. 1; Equations 9–14, inclusive, show the reactions involved in the example illustrated in Fig. 9; and Equations 15–18, inclusive, suggest several specific examples of the various ways by which I may synthesize the compounds of Figs. 7 and 8.

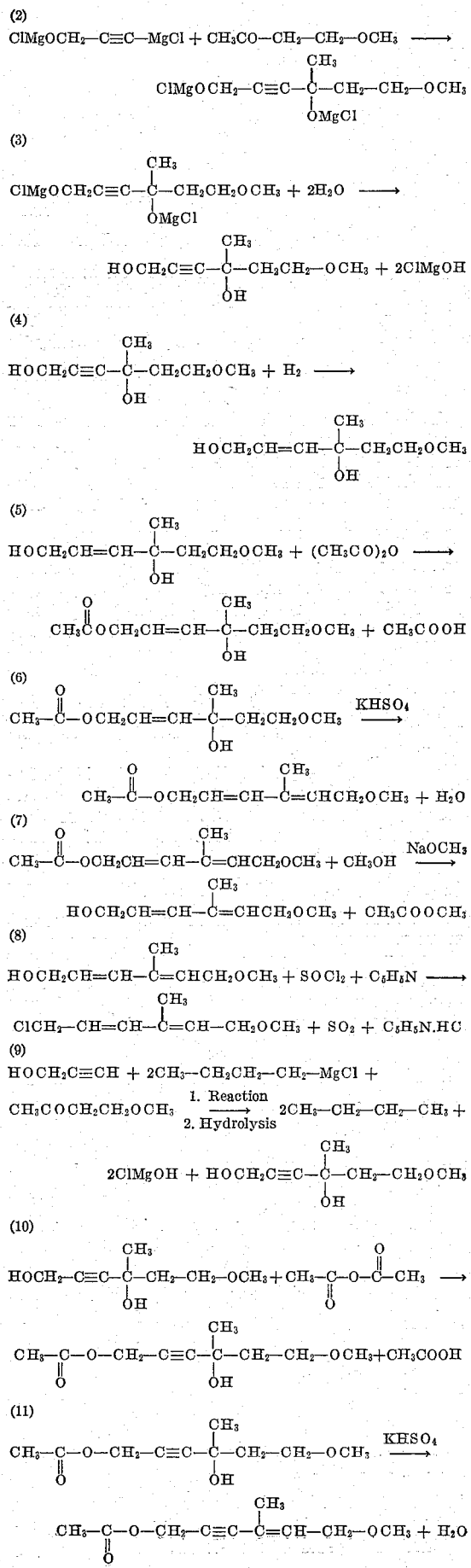

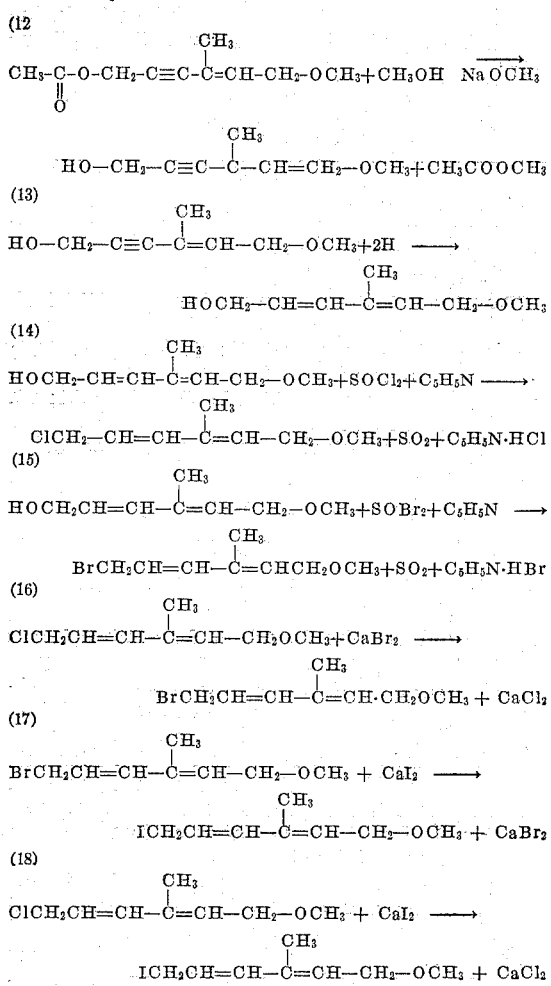

The preparation of 1-acyloxy-4-hydroxy-6-alkoxy-4-methylhexene-2 is not described in detail nor claimed in this application. It is so described and is claimed in copending application Serial No. 747,179. However, as stated above, in order to completely disclose at least one example of my method of forming a 1-hydroxy-6-alkoxy-4-methylhexadiene-2,4 involving the forming of such a compound as an intermediate, I have shown herein one method of synthesizing 1-acetoxy-4-hydroxy-6-methoxy-4-methylhexene-2 which is a specific example of a 1-acyloxy-4-hydroxy-6-alkoxy-4-methylhexene-2.

The esterification of the hydroxyl group on carbon atom No. 1, is accomplished by an acid or an acid derivative such as an acid halide or an acid anhydride which are equivalents for the esterification of the diol. Any organic ester is within the scope of the invention. However, for ease of manipulation in subsequent reactions, esters of lower molecular weight fatty acids are preferred.

Nor is the preparation of a 1-hydroxy-6-alkoxy-4-methylhexene-4-yne-2 described in detail in this application. It is so described and is claimed in copending application Serial No. 747,177. However, in order to completely disclose at least one example of my method of forming a 1-hydroxy-6-alkoxy-4-methylhexadiene-2,4 involving the forming of such a compound as an intermediate, I have shown herein one method of synthesizing 1-hydroxy-6-methoxy-4-methylhexene-4-yne-2.

In general the illustrated process of synthesizing 1-acetoxy-4-hydroxy-6-methoxy-4-methylhexene-2 comprises the reaction of propargyl alcohol with butylmagnesium chloride to form a complex reagent and the reaction thereof with 4-methoxybutanone-2; the hydrolyzation thereof to produce a 6-methoxy-4-methylhexyne-2-diol-1,4; the reduction of the methylhexynediol and the distillation of the products to produce 6-methoxy-4-methylhexene-2-diol-1,4; the reaction of the methylhexene-diol with acetic anhydride and the distillation of the product to produce a 1-acetoxy-4-hydroxy-6-methoxy-4-methylhexene-2.

In general the illustrated process of synthesizing 1-hydroxy-6-methoxy-4-methylhexene-4-yne-2, comprises the formation of a complex organometallic reagent by the reaction of propargyl alcohol with butylmagnesium chloride; to form a complex, organo metallic reagent; the reaction of the reagent thus formed with 4-methoxybutanone-2; the hydrolyzation of the resultant compound to produce a 6-methoxy-4-methylhexyne-2-diol-1,4; the reaction of the methylhexynediol with acetic anhydride and distillation of the products to produce 1-acetoxy-4-hydroxy-6-methoxy-4-methylhexyne-2; the dehydration of the acetoxyhydroxymethoxymethylhexyne with potassium acid sulfate to produce a 1-acetoxy-6-methoxy-4-methylhexene-4-yne-2; and the alcoholysis of this product with sodium methoxide in methanol to produce 1-hydroxy-6-methoxy-4-methylhexene-4-yne-2.

The following examples I to V, inclusive, are presented in illustration of my invention.

EXAMPLE I

PREPARATION OF "DIENE-OL ACETATE"

*1-acetoxy-6-methoxy-4-methylhexadiene-2,4*

In a 50 ml. Claisen flask were placed 10 g. (0.05 mole) of "ene-diol acetate" (1-acetoxy-4-hydroxy-6-methoxy-4-methylhexene-2) and 6.8 g. (0.05 mole) of freshly fused and crushed potassium acid sulfate. The flask was arranged for vacuum distillation, introducing illuminating gas through the capillary tube, and evacuated to 1.0 mm. Heat from an oil bath was then applied gradually over a period of one hour until distillation occurred.

| Fraction | Vapor Temp. | Bath Temp. | Pressure | Weight | $n_D^{20}$ |
|---|---|---|---|---|---|
|  | Degrees | Degrees | Mm. | Grams |  |
| 1 | 74–77.8 | 101–102 | 1.0 | 1.1 | 1.4615 |
| 2 | 77.8–81 | 102–107 | 1.0 | 6.3 | 1.4711 |

The main fraction, 6.3 g. of viscous yellow oil, amounted to a yield of 69% of theoretical.

Neutral equivalent:
 Observed, 188.2; 188.4.
 Calcd., 184.0.

Analysis:
 Calcd. for $C_{10}H_{16}O_3$: C, 65.2; H, 8.8.
 Found: C, 65.5; H, 8.9.

The structural formula of the product is:

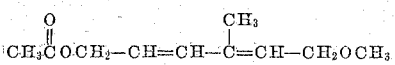

EXAMPLE II

PREPARATION OF "DIENE-OL"

*1-hydroxy-6-methoxy-4-methylhexadiene-2,4*

In a 200 ml. round-bottomed flask fitted with a ground-in condenser holding a calcium chloride tube in the top, where placed 11.6 g. (0.06 mole)

of "diene-ol acetate" (1-acetoxy-6-methoxy-4-methylhexadiene-2,4), 2.7 g. (0.05 mole) of sodium methoxide, and 100 ml. (2.47 mole) of absolute methanol. The mixture was refluxed for five hours, during which time it turned brown. By distillation, 30 ml. of methanol was then removed.

To the reaction mixture were added 100 ml. of water, 17 ml. of concentrated hydrochloric acid, and 90 ml. of ether. After separation of the ether layer, the aqueous layer was extracted with 140 ml. of ether in small portions.

The combined ether extracts were then washed with 150 ml. of saturated sodium bicarbonate solution. The ether layer was dried over anhydrous calcium sulfate, the ether removed by distillation at atmospheric pressure and the residue distilled under vacuum, introducing illuminating gas through the capillary tube.

| Fraction | Vapor Temp. | Bath Temp. | Pressure | Weight | $n_D^{20}$ |
|---|---|---|---|---|---|
| | Degrees | Degrees | Mm. | Grams | |
| 1 | 55–72 | 84–94 | 1.0 | 0.3 | 1.4858 |
| 2 | 72–76 | 94–110 | 1.0 | 3.9 | 1.4942 |

Fraction 2 (3.9 g.) represented a yield of 43.6% of theoretical.
Analysis:
  Calcd. for $C_8H_{14}O_2$: C, 67.6; H, 9.9.
  Found: C, 67.3; H, 10.0.
The structural formula of the product is:

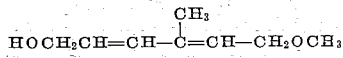

This "diene-ol" product (1-hydroxy-6-methoxy-4-methylhexadiene-2,4) was characterized by forming a solid p-nitrophenyl urethan derivative by reacting 1 mole of the "diene-ol" with 1 mole of para-nitrophenylurethane. The derivative, M. P. 116–118°, was analyzed for $C_{15}H_{18}O_5N_2$ as follows:

| | Calculated | Observed |
|---|---|---|
| C | 58.82 | 58.84; 59.17 |
| H | 5.88 | 5.89; 5.65 |
| N | 9.15 | 9.70; 9.60 |

EXAMPLE III

PREPARATION OF "DIENE-CHLORIDE"
*1-chloro-6-methoxy-4-methylhexadiene-2,4*

A mixture of 3.4 ml. (0.0046 mole) of purified thionyl chlorine and 2.4 ml. of anhydrous pyridine was placed in a 25 ml. Erlenmeyer flask, which was stoppered and cooled in an ice bath. To this mixture, by means of a medicine dropper, was added a solution of 6.0 g. (0.042 mole) "diene-ol" (1 - hydroxy-6-methoxy-4-methylhexadiene-2,4) dissolved in 2.0 ml. of anhydrous pyridine, making a total of 4.4 ml. (0.055 mole) of pyridine.

After standing in ice water for four hours, the contents of the flask were taken up in 30 ml. of cold water, and acidified with 2 ml. of concentrated hydrochloric acid.

The brown oil which formed was extracted with 100 ml. of ether and the ether layers washed cautiously with 60 ml. of saturated sodium bicarbonate solution. The ether solution was filtered through anhydrous sodium sulfate and treated with anhydrous calcium sulfate.

The ether was removed under vacuum and the residue distilled from a 10 ml. Claisen flask, introducing illuminating gas through the capillary tube.

| Fraction | Vapor Temp. | Bath Temp. | Pressure | Weight | $n_D^{20}$ |
|---|---|---|---|---|---|
| | Degrees | Degrees | Mm. | Grams | |
| 1 | 42–61 | 72–82 | 1.5 | 1.2 | 1.4919 |
| 2 | 61.5–66 | 83–96 | 1.5 | 1.6 | 1.4980 |

Residual tar

Fraction 2 (1.6 g.) amounted to a 23.6% yield.
Analysis:
  Calcd. for $C_8H_{13}OCl$: C, 59.81; H, 8.16; Cl, 20.94.
  Found: C, 60.33, 60.23; H, 8.35, 8.31; Cl, 20.94, 21.25.
The structural formula of the product is:

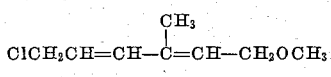

EXAMPLE IV

PREPARATION OF 1-BROMO-6-METHOXY-4-METHYL-HEXADIENE-2,4

Four and nine-tenths ml. of $PBr_3$ (phosphorus tribromide) was added dropwise with stirring to a solution of 18 g. of 1-hydroxy-6-methoxy-4-methylhexadiene-2,4 and 3.4 ml. of pyridine, keeping the temperature of the reactants at 10° C. during the addition by means of an ice-salt bath. After the addition had been completed, the reaction mixture was stirred for 45 minutes at −10° C.; for 45 minutes at room temperature; for 15 minutes at 50° C.

The reaction mix was then poured into ice water, the organic layer broken up in ether, and the ether solution washed with dilute alkali, then with water and finally dried. The solvent was removed by distillation and the 1-bromo-6-methoxy-4-methylhexadiene-2,4 was distilled under reduced pressure. Seventeen g. (66%) of the material (B. P. 80–90° C.) was obtained. The structural formula of the product is:

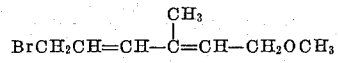

EXAMPLE V

PREPARATION OF 1-HYDROXY-6-METHOXY-4-METHYLHEXADIENE-2,4

This compound was prepared by reducing 0.7 g. of 1-hydroxy-6-methoxy-4-methylhexene-4-yne-2 under low hydrogen pressure using a palladium-on-charcoal catalyst in absolute alcohol. After one equivalent of hydrogen was taken up, the absorption ceased. The catalyst was removed by filtration, the alcohol solvent removed and the residue distilled at 65–70° C. under 1 mm. pressure. Yield=0.5 g.

The product was characterized by a solid p-nirophenyl urethan derivative, M. P. 116–118° C. The product has the following structural formula:

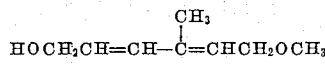

Analysis:

| | Calcd. | Found |
|---|---|---|
| C | 58.82 | 58.84, 59.17 |
| H | 5.88 | 5.89, 5.65 |
| N | 9.15 | 9.70, 9.60 |

While the forms of embodiments of the present invention as herein disclosed constitute preferred forms, it is to be understood that other forms might be adopted, all coming within the scope of the claims which follow.

I claim:

1. As a new composition of matter, a diene-ol having the general structural formula of

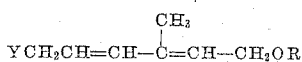

where Y is a member of the group consisting of a hydroxyl and fatty acid esters thereof which have not more than five carbon atoms and R is an alkyl group having not more than six carbon atoms.

2. A new composition of matter consisting of 1-hydroxy-6-lower alkoxy-4-methylhexadiene-2,4.

3. A new composition of matter consisting of 1-acetoxy-6-methoxy-4-methylhexadiene-2,4.

4. A new composition of matter consisting of 1-hydroxy-6-methoxy-4-methylhexadiene-2,4.

5. A new composition of matter consisting of 1-acyloxy-6-lower alkoxy-4-methylhexadiene-2,4, wherein the acyloxy group is derived from carboxylic acid.

6. A process of preparing 1-acetoxy-6-alkoxy-4-methylhexadiene-2,4 which comprises dehydrating 1-acetoxy-4-hydroxy-6-alkoxy-4-methylhexene-2 and isolating and purifying the product formed.

7. A process of preparing an organic carboxylic acid ester of a 1-hydroxy-6-alkoxy-4-methylhexadiene-2,4 which comprises the step of heating a 1-acyloxy-4-hydroxy-6-alkoxy-4-methylhexene-2 wherein the acyloxy group is derived from carboxylic acid in the presence of a dehydrating agent.

8. A process of preparing a 1-hydroxy-6-alkoxy-4-methylhexadiene-2,4 which comprises the alcoholysis of a 1-acyloxy-6-alkoxy-4-methylhexadiene-2,4, wherein the acyloxy group is derived from carboxylic acid, with an alcoholic solution of a metal alcoholate.

9. A process of preparing a 1-hydroxy-6-methoxy-4-methylhexadiene-2,4 which comprises the alcoholysis of a 1-acetoxy-6-methoxy-4-methylhexadiene-2,4 with an alcoholic solution of a metal alcoholate.

10. A process of preparing an organic carboxylic acid ester of a 1-hydroxy-6-alkoxy-4-methylhexadiene-2,4 which comprises the step of heating a 1-acyloxy-4-hydroxy-6-alkoxy-4-methylhexene-2, wherein the acyloxy group is derived from carboxylic acid, in the presence of a dehydrating agent, and isolating and purifying the product formed.

11. A process of preparing 1-acetoxy-6-methoxy-4-methylhexadiene-2,4 which comprises heating 1 - acetoxy - 4 - hydroxy - 6 - methoxy - 4-methylhexene-2 with potassium acid sulfate and isolating and purifying the product formed.

12. A process of preparing a 1-hydroxy-6-alkoxy-4-methylhexadiene-2,4 which comprises the alcoholysis of a 1-acyloxy-6-alkoxy-4-methylhexadiene-2,4, wherein the acyloxy group is derived from carboxylic acid, with a methanol solution of sodium methoxide.

13. A process of preparing a 1-hydroxy-6-alkoxy-4-methylhexadiene-2,4 which comprises the steps of heating a 1-acyloxy-4-hydroxy-6-alkoxy-4-methylhexene-2, wherein the acyloxy group is derived from carboxylic acid, in the presence of a dehydrating agent; and alcoholizing the resulting product with an alcoholic solution of a metal alcoholate.

MELVIN S. NEWMAN.

REFERENCES CITED

The following references are of record in the file of this patent:

UNITED STATES PATENTS

| Number | Name | Date |
|---|---|---|
| 2,122,716 | Graves | July 5, 1938 |
| 2,253,342 | Mikeska et al. | Aug. 19, 1941 |
| 2,298,186 | Woodhouse | Oct. 6, 1942 |
| 2,369,157 | Milas | Feb. 13, 1945 |
| 2,369,159 | Milas | Feb. 13, 1945 |
| 2,382,085 | Milas | Aug. 14, 1945 |
| 2,382,086 | Milas | Aug. 14, 1945 |
| 2,412,465 | Milas | Dec. 10, 1946 |

OTHER REFERENCES

Kipping, "Chemistry and Industry," 1939, page 802.

Johnson, "Acetylenic Compounds," vol. 1, entitled "Acetylenic Alcohols" (1946), Arnold & Company (London), publishers, pages 90–92.